US006980815B1

(12) United States Patent
Enzmann et al.

(10) Patent No.: US 6,980,815 B1
(45) Date of Patent: Dec. 27, 2005

(54) WIRELESS TERMINAL LOCATOR

(75) Inventors: Mark J. Enzmann, Roswell, GA (US); Robert T. Moton, Alpharetta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 569 days.

(21) Appl. No.: 10/074,413

(22) Filed: Feb. 12, 2002

(51) Int. Cl.[7] .................................................. H04Q 7/20
(52) U.S. Cl. .................... 455/456.1; 455/420; 455/458
(58) Field of Search .......................... 455/456.1, 456.2, 455/456.5, 458, 418, 419, 420

(56) References Cited

U.S. PATENT DOCUMENTS

| | | | | |
|---|---|---|---|---|
| 5,939,986 | A * | 8/1999 | Schiffbauer et al. | 340/573.1 |
| 6,128,485 | A * | 10/2000 | Mori et al. | 455/422.1 |
| 6,311,055 | B1 | 10/2001 | Boltz | |
| 6,314,282 | B1 | 11/2001 | Weber et al. | |
| 6,314,286 | B1 | 11/2001 | Zicker | |
| 6,343,212 | B1 * | 1/2002 | Weber et al. | 455/404.1 |
| 6,490,455 | B1 * | 12/2002 | Park et al. | 455/456.4 |
| 6,496,703 | B1 * | 12/2002 | da Silva | 455/456.4 |
| 6,718,175 | B1 * | 4/2004 | Edstam | 455/456.5 |

FOREIGN PATENT DOCUMENTS

| | | |
|---|---|---|
| EP | 0 891 110 A1 | 1/1999 |
| EP | 1 041 848 A1 | 10/2000 |

* cited by examiner

*Primary Examiner*—Erika A. Gary
(74) *Attorney, Agent, or Firm*—Cantor Colburn LLP

(57) ABSTRACT

A portable device comprising a base station emulator programmable to emit a signal and selectively page a wireless terminal that tunes to the signal to register, wherein the paging signal reveals the location of the wireless terminal. A method of locating an active wireless terminal inside an area. The method comprises transmitting an overhead signal that is dominant inside the area, receiving an identification signal from the wireless terminal and selectively paging the identified wireless terminal to reveal its location inside the area.

13 Claims, 5 Drawing Sheets

WIRELESS TERMINAL LOCATOR

DESCRIPTION OF THE INVENTION BACKGROUND

Mobile or wireless terminals, such as cell phones, mobile phones, and similar wireless devices are no longer the hallmark of traveling business executives and other professionals, but have become essential personal items that are always carried by many people all over the world on their persons.

Modern cell phones are equipped with a feature known as enhanced home network. This feature allows cell phone users to operate their phones throughout North America or the European Community commonly without incurring roaming charges. Because the cell phones are, therefore, operational at no additional prohibitive cost across borders between states or countries, there is no reason to leave them behind while traveling. In a sense, the cell phone goes where its owner goes, and this, unfortunately, includes environments in which use of cell phones is undesirable, dangerous or even illegal.

In entertainment places, such as theaters, opera houses, symphony and music halls, ringing of cell phones is not only disruptive, but it may also interfere with aesthetic or other aspects of the performance. In government buildings and courthouses, security reasons may place additional restrictions on the use or even admittance of cell phones. In airplanes, in explosives handling sites, hospitals and other places in which radio-operated equipment may be used, the operation of cell phones may lead to spurious radio transmissions that may cause interference, malfunction and may even trigger catastrophic events with human casualties.

Currently, X-Ray machines and scanners are used to discover and confiscate cell phones at the entrance to courthouses and other places in which these devices are prohibited. Spotting miniature cell phones through X-ray machines is difficult and time-consuming, especially when greater priority is placed on discovering items that may be used as weapons.

U.S. Pat. No. 6,314,286 B1 discloses control of telecommunication services for subscriber-provided radio communication devices residing in a miniature cellular environment.

U.S. Pat. No. 6,311,055 B1 discloses a system and method for providing restrictions on mobile-originated calls.

U.S. Pat. No. 6,314,282 B1 discloses transmitting group ID information to exclude a group of mobile terminals from changing their operation mode.

European Patent publication EP 1 041 848 A1 discloses protecting a predetermined area from disturbing usage of mobile terminals by means of a paging message.

European Patent publication EP 0 891 110 A1 discloses a method and system for preventing a mobile station from causing disturbance.

SUMMARY

One embodiment of the invention provides a wireless terminal locator. The locator comprises a transmitter for transmitting a dominant overhead signal inside an area in which external overhead signals have been attenuated. The locator includes a receiver for receiving a wireless terminal identification inside the area and a processor operable for instructing the transmitter to selectively page an identified wireless terminal and to reveal its location inside the area.

BRIEF DESCRIPTION OF THE DRAWINGS

In the accompanying Figures, there are shown present embodiments of the invention wherein like reference numerals are employed to designate like parts and wherein.

DETAILED DESCRIPTION OF THE INVENTION

Figure 1:
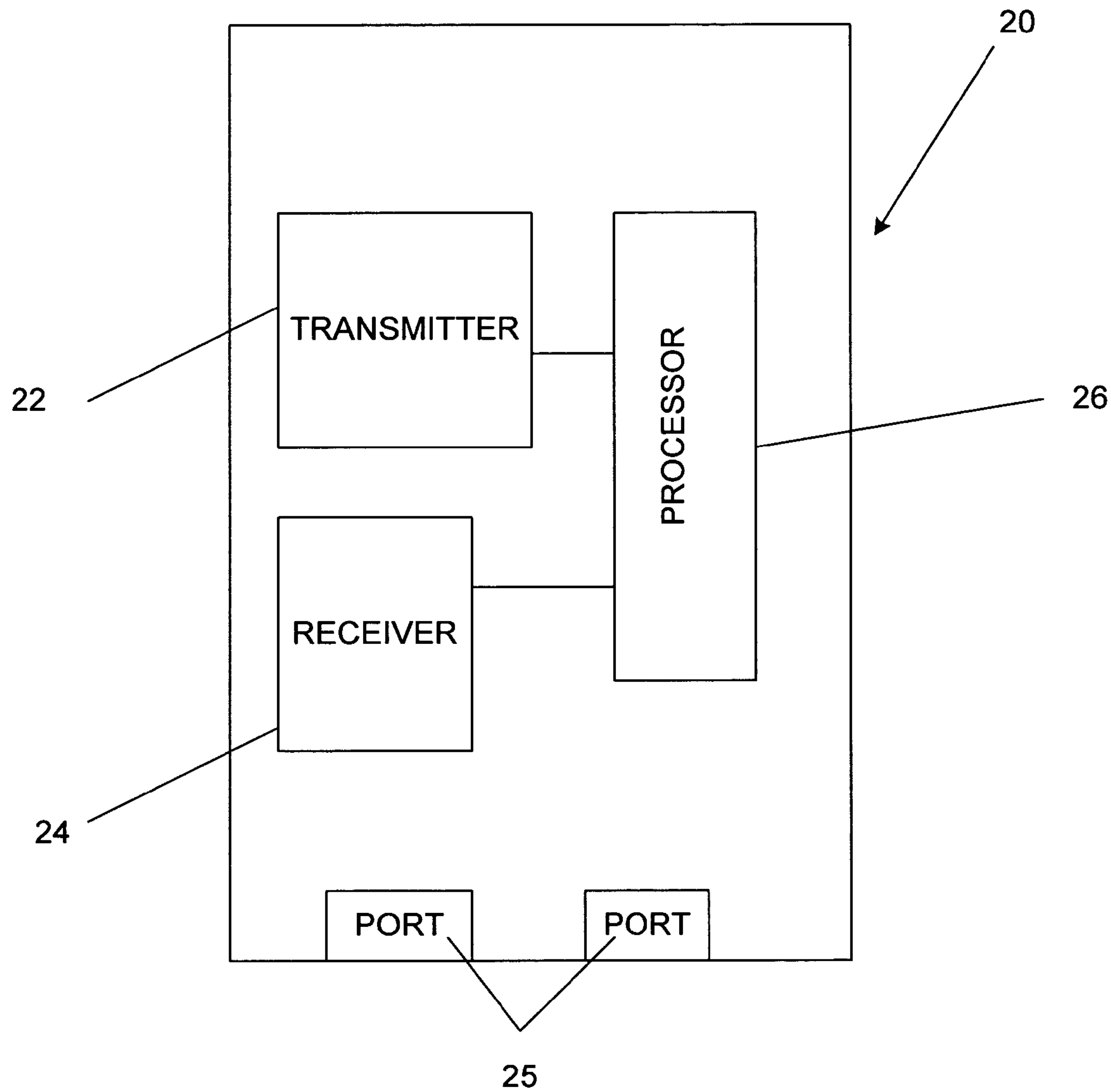
FIG. 1 is a block diagram of an embodiment of the wireless phone locator of the present invention.

Referring now to the drawings for the purpose of illustrating the invention and not for the purpose of limiting the same, it is to be understood that standard components or features that are within the purview of an artisan of ordinary skill and do not contribute to the understanding of the various embodiments of the invention are omitted from the drawings to enhance clarity.

Figure 3:
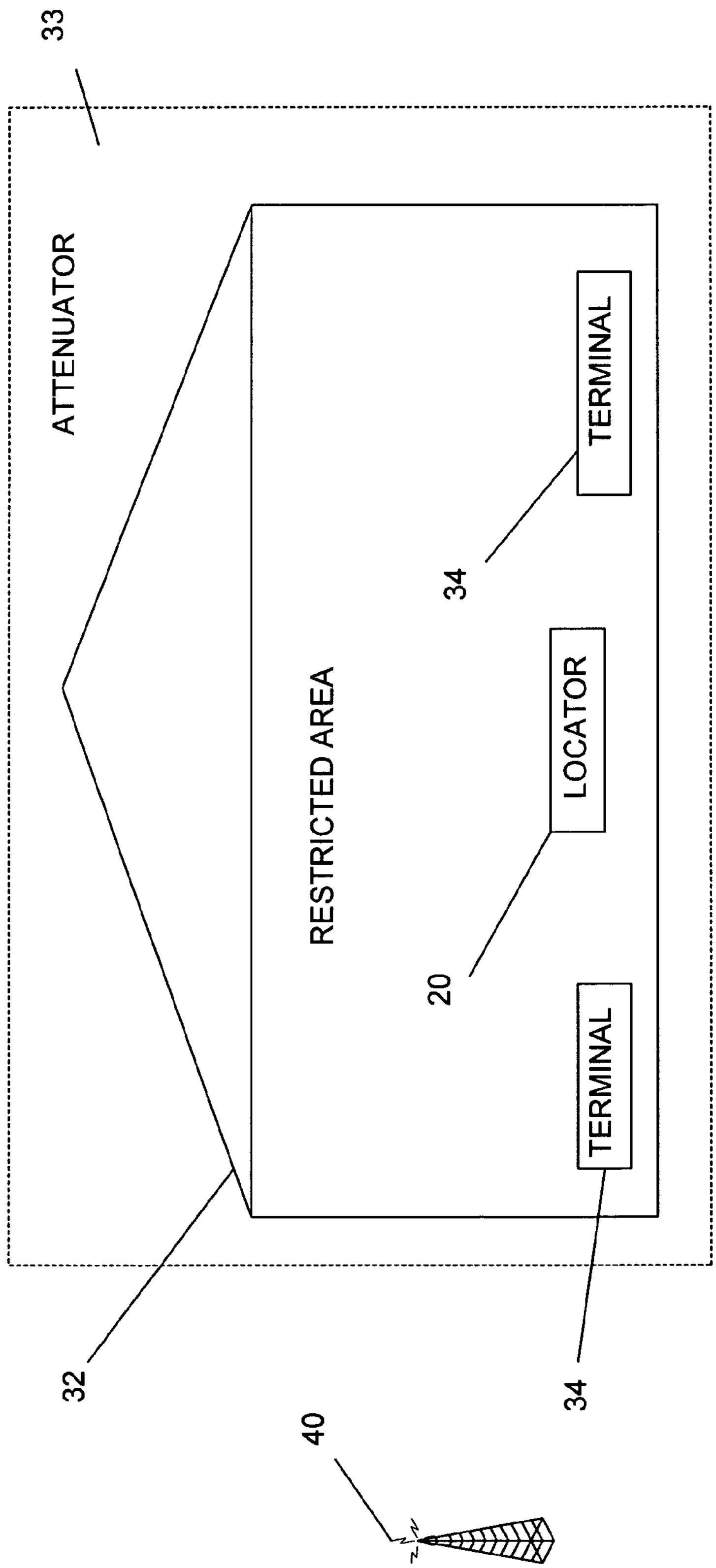
FIG. 3 is a diagrammatic view of an embodiment of the wireless terminal locator of the present invention in an operational environment.

FIG. 1 is a block diagram of an embodiment of a wireless terminal locator 20 for use in a restricted area 32, shown in FIG. 3. The wireless terminals 34 may include any subscriber-provided handsets, such as cell phones, pagers, wristwatch phones, PDA devices, etc. that can communicate wirelessly by means of electromagnetic radiation regardless of the service carrier. Both analog and digital wireless terminals 34 may be located without modification and regardless of whether the underlying technology is, for example, AMPS, NAMPS, TDMA, CDMA, GSM-NA, PACS, etc. Wireless terminals may also include e-mail and pager devices that operate through the GSM phone network.

Figure 2:
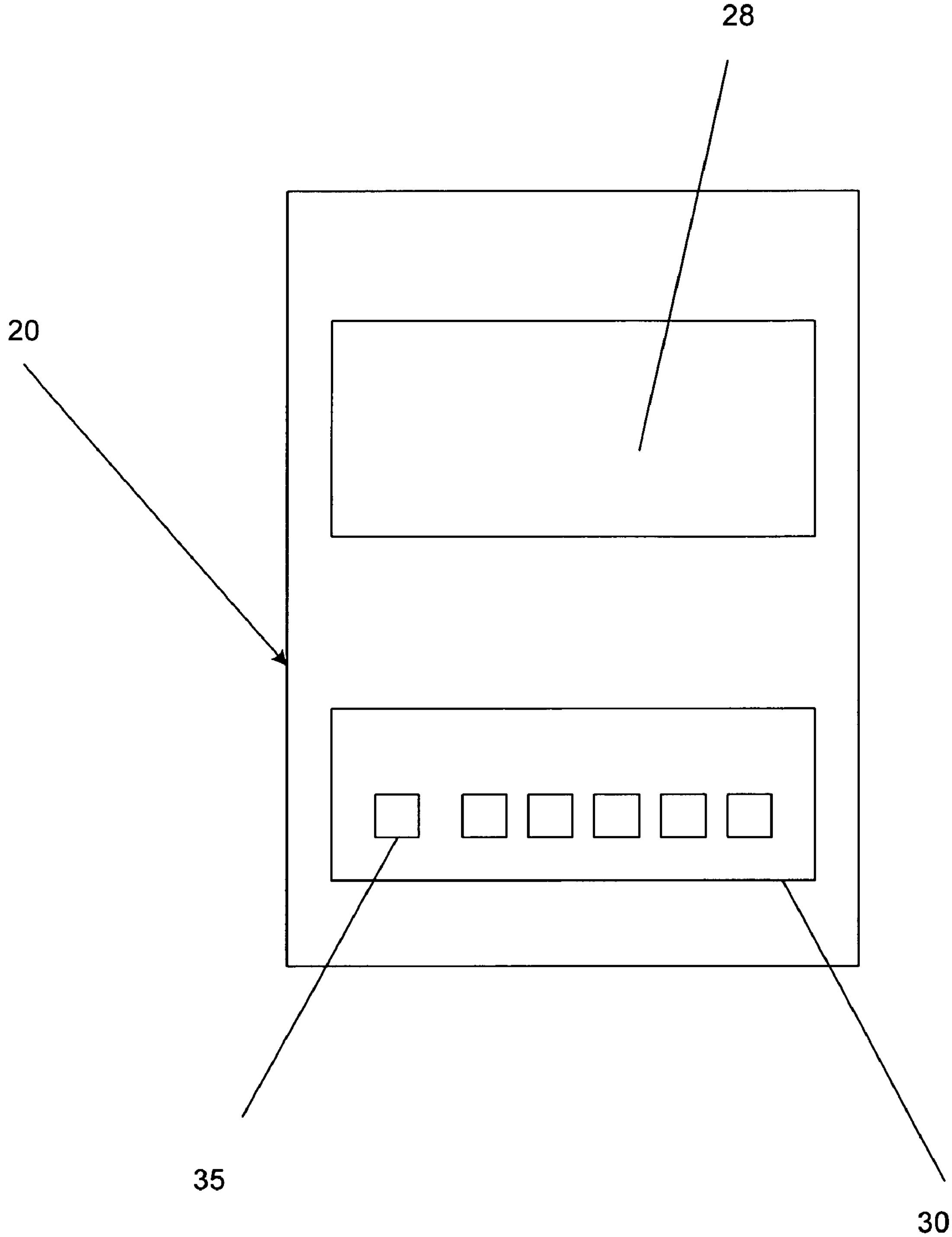
FIG. 2 is plan view of an embodiment of the wireless terminal locator of the present invention.

One embodiment of the wireless terminal locator 20 includes a transmitter 22 and a receiver 24. See FIG. 1. The wireless terminal locator 20 may also include a processor 26, such as microcomputer having, for example, a data storage device, a microprocessor and a logic controller. Although not necessary, the processor 26 may interface with a display 28 and a keyboard 30 or other controls 35 for providing operator input, such as switches, knobs etc. See FIG. 2. A microcontroller, such as one manufactured by Motorola or a microprocessor, such as Motorola series 68K, coupled with a buffer or other data storage device may also be used as the processor 26.

The wireless terminal locator 20 may be portable, of miniature size, handheld, wearable or may be mounted on a wall or other surface.

In one embodiment, the wireless terminal locator 20 is programmable to emulate a base station that can transmit a system identification (SID) overhead signal, at a strength that may be several orders of magnitude less than the strength of an ordinary external network base station 40. For example, a typical external base station 40 may transmit radiation at 18 W, while the wireless terminal locator 20 may transmit at, for example, 500 $\mu$W (microwatts) depending on the particular restricted area 32.

A restricted area 32 is defined as an area in which use of wireless terminals 34 is undesirable or prohibited and may also be characterized by the fact that it includes a natural or artificial isolator/attenuator 33 for external sources of electromagnetic radiation, such as the base stations of a wireless service network. A natural isolator/attenuator 33 may be provided, for example, by lack of visibility of the base station 40 from a wireless terminal 34 in a subterranean location, such as an underground parking structure, etc. An artificial isolator/attenuator 33 may, for example, comprise an isolation blanket, such as a grounded framework that is constructed to envelop a structure. The isolator 33 may be total or partial, such that an external signal from a base station 40 transmitting at, for example, 18 W, is either completely blocked or reduced to a level on the order of 30 $\mu$W. A partial isolator may be equivalent to an attenuator.

The restricted area 32 may be a stationary structure or facility, such as a government building, a courthouse, a hospital, an explosives handling site, or a mobile facility, such as an airplane or boat, or any facility in which the operation of wireless terminals may cause undesirable disturbance or interference with sensitive equipment.

Because signals from an external base station 40 inside the restricted area 32 are commonly significantly reduced, the wireless terminal locator 20 may transmit the dominant overhead signal inside the restricted area 32, even though that signal may be weak in comparison to the signal of a typical external base station 40. Accordingly, in accordance with one form of the present invention, a wireless terminal locator 20 with inexpensive components can emulate a base station 40 inside the restricted area 32.

Any active wireless terminals 34 within the restricted area 32 will automatically tune to the overhead signal transmitted by the wireless terminal locator 20 and will complete the registration process, i.e. the active wireless terminals will transmit their identification information to the wireless terminal locator 20.

The wireless terminal locator 20 may be programmed to page all or some of the active wireless terminals 34 that have registered in a predetermined or operator-selected manner and at a predetermined or operator-selected time, causing them to emit an audible ring which will reveal their physical location.

The identified wireless terminals 34 may also be placed in a queue, and each wireless terminal in the queue may be paged individually, and located before the next one is paged, and so on. Queuing allows the operator of the wireless terminal locator 20 or other authorized agent in the restricted area 32 to remove the located wireless terminals 34 one at a time.

Figure 4:
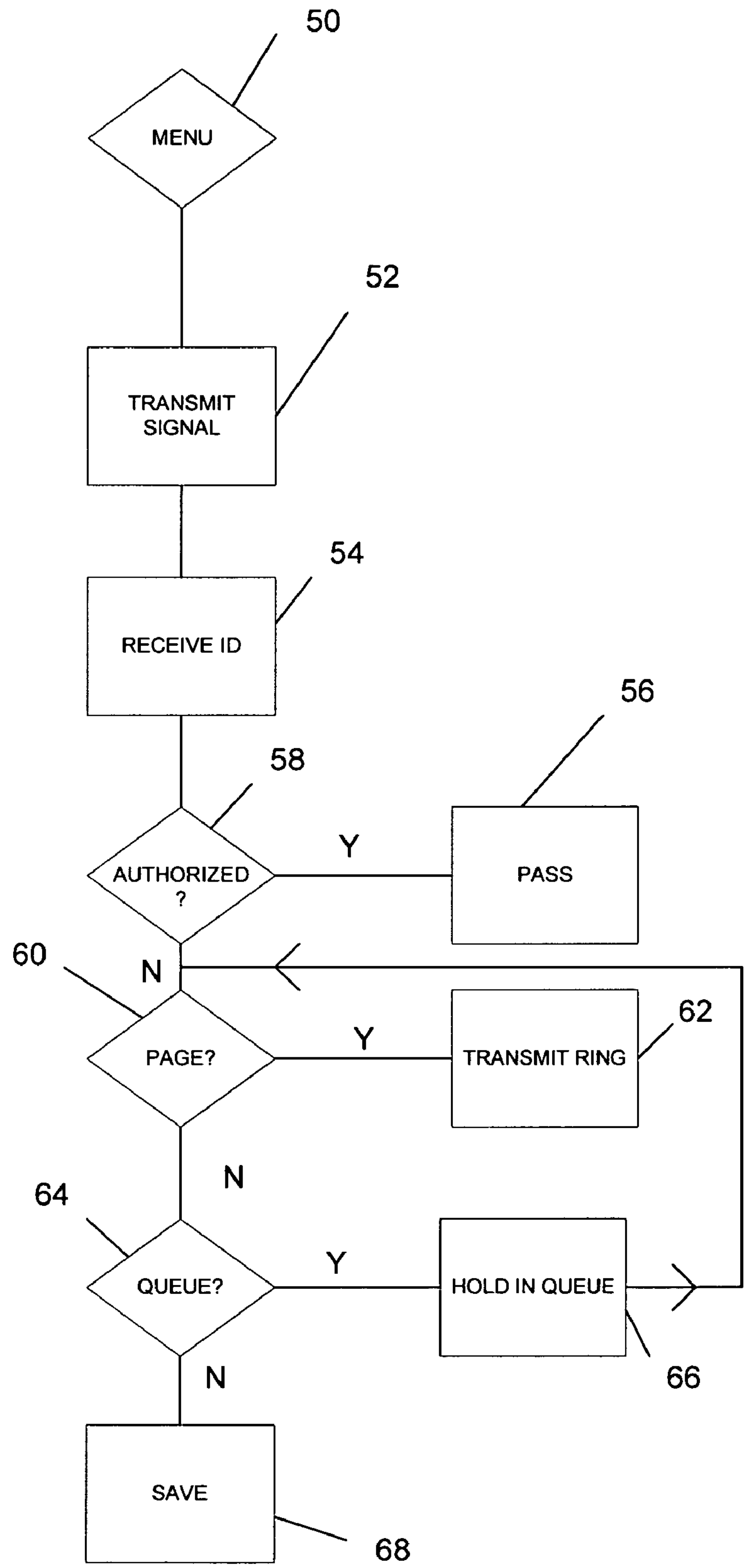
FIG. 4 is an exemplary flowchart of the operation of an embodiment of the wireless terminal locator of the present invention.
Figure 5:
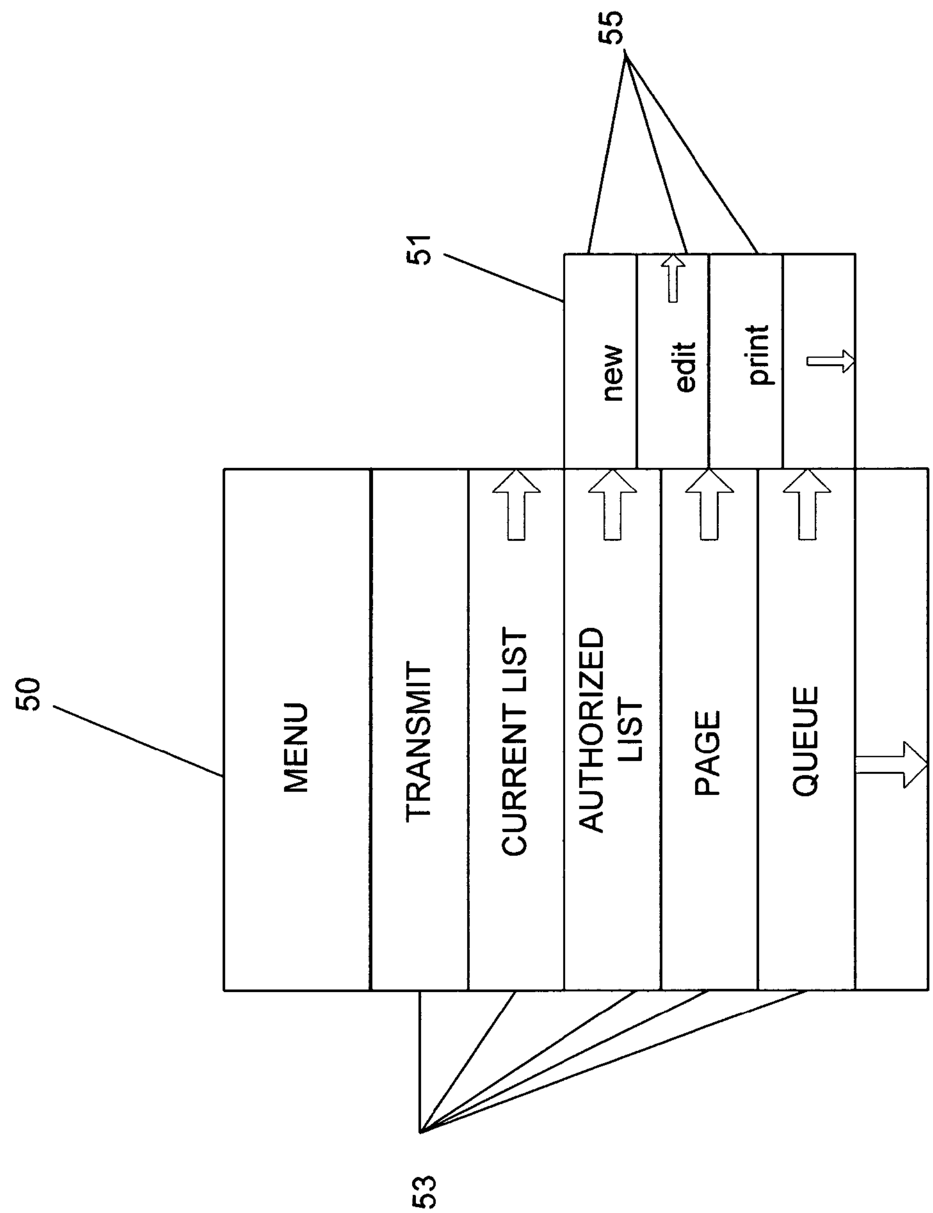
FIG. 5 is an exemplary menu of an embodiment of the wireless terminal locator of the present invention.

The wireless terminal locator 20 may also be programmed to allow some of the wireless terminals 34, such as those of authorized personnel, to remain active in the restricted area 32, without first paging and physically identifying them. This may be accomplished, for example, in the manner shown in the flowchart of FIG. 4. Upon powering the wireless terminal locator 20, a main menu 50 may be displayed on the screen 28 of the wireless terminal locator 20. An embodiment of a main menu 50 is illustrated in FIG. 5. The main menu may include menu options 53, such as, for example, "transmit", "current list", "authorized list", "page", "queue", etc. A menu option 53 may include a submenu 51, an example of which is shown appended to the "authorized list" option 53 of the main menu 50. The submenu 51 may include sub-options 55, such as, for example, "new", "edit", "print", etc., which may be selected to allow an operator of the wireless terminal locator 20 to view an existing list of wireless terminal identification numbers, edit such list, print it, save it, or export it to some other device through communication ports 25, and so on.

Another of the sub-options 55 may be to create a new list, for example a list of authorized identification numbers, edit such list, and so on.

The operation of the wireless terminal locator 20 will now be explained in reference to FIG. 4. From menu 50, a "transmit signal" option 52 is selected to activate the wireless terminal locator 20 causing it to transmit an overhead signal. Once the signal is transmitted, the active wireless terminals 34 begin to register by transmitting their identification numbers, which are received by the wireless phone locator 20 at task 54. The registering identification numbers are queried for authorization at task 58. Authorization may be provided by comparing each registering identification number with a pre-existing list that has been stored in the processor 26, or by operator input for real time control. An authorized wireless terminal 34 is removed from the current registration list at task 56.

The next task is a query whether to page the non-authorized wireless terminals at task 60. A paging sequence may be pre-programmed in the processor 26, such that the registered wireless terminals 34 are paged sequentially in time intervals that are determined by factors such as available personnel, area of coverage, etc. Alternatively, the paging sequence may be controlled by operator input. If the page query 60 is answered affirmatively for an active wireless terminal 34, an audible ring message is sent to the wireless terminal 34 at task 62. The audible ring reveals the location of the wireless terminal 34 inside the restricted area 32, and an operator may physically remove or confiscate the wireless terminal 34.

If the paging query 60 is answered negatively, the identification numbers of the registered wireless terminals 34 are channeled through a queue query 64, with one choice being to be held in queue at task 66 and to be queried at a later time. This feature may be exercised, for example, if there is some delay in removing a previously paged wireless terminal 34, or if the removal personnel or the operator of the wireless terminal locator 20 are temporarily unavailable.

A choice to remove from the queue and save the registration numbers at task 68 may be exercised, for example, if paging is not desired or is aborted either for a particular wireless terminal 34 or for all the wireless terminals 34 in the registration list, but the registration list or particular identification number need to be saved, for example, for legal action, for notification or any other purpose.

Whereas particular embodiments of the invention have been described herein for the purpose of illustrating the invention and not for the purpose of limiting the same, it will be appreciated by those of ordinary skill in the art that numerous variations of the details, materials and arrangement of parts may be made within the principle and scope of the invention without departing from the spirit invention. The preceding description, therefore, is not meant to limit the scope of the invention. Rather the scope of the invention is to be determined only by the appended claims and their equivalents.

What is claimed is:

1. A wireless terminal locator, comprising:

a transmitter for transmitting a dominant overhead signal inside an area in which external overhead signals have been attenuated;

a receiver for receiving a wireless terminal identification inside the area; and a processor operable for instructing the transmitter to selectively page an identified wireless terminal to cause the identified wireless terminal to emit an audible ring and to reveal a location of the identified wireless terminal inside the area.

2. The wireless terminal locator of claim 1, wherein the locator is handheld.

3. The wireless terminal locator of claim 1, wherein the locator is portable.

4. The wireless terminal locator of claim 1, wherein the locator is wall mounted.

5. The wireless terminal locator of claim 1, further comprising a data storage device.

6. The wireless terminal locator of claim 1, further comprising a display.

7. The wireless terminal locator of claim 1, further comprising an operator interface for real time control.

8. A wireless terminal locator, comprising:

means for transmitting a dominant overhead signal inside an area in which external overhead signals have been attenuated;

means for receiving a wireless terminal identification inside the area; and processor means for instructing the transmitting means to selectively page an identified wireless terminal to cause the identified wireless terminal to emit an audible ring and thereby reveal a location of the wireless terminal inside the area.

9. A method of locating a wireless terminal inside an area in which external overhead signals have been attenuated, the method comprising:

transmitting an overhead signal that is dominate inside the area;

receiving an identification from the wireless terminal; and selectively paging the identified wireless terminal to cause the identified wireless terminal to emit all audible ring and audibly reveal a location of the wireless terminal inside the area.

10. The method of claim 9, further comprising:

queuing the identified wireless terminal before paging.

11. The method of claim 9, further comprising comparing the identification information with a predetermined list of wireless terminal identifications and paging the wireless terminal when it is not included in the predetermined list.

12. The method of claim 9, wherein selectively paging comprises paging the wireless terminal only when operator input to page the wireless terminal is provided.

13. The method of claim 9, wherein selectively paging comprises paging the wireless terminal unless operator input not to page the wireless terminal is provided.

* * * * *